United States Patent [19]
Steuby

[11] 3,782,410
[45] Jan. 1, 1974

[54] VALVE

[76] Inventor: Thomas A. Steuby, 6363 Olive Blvd., Kirkwood, Mo. 63130

[22] Filed: Dec. 26, 1972

[21] Appl. No.: 318,010

[52] U.S. Cl.................................. 137/496, 137/508
[51] Int. Cl............................................. F16k 17/04
[58] Field of Search............................ 137/496, 508

[56] References Cited
UNITED STATES PATENTS

| | | | |
|---|---|---|---|
| 2,006,319 | 6/1935 | Hueber | 137/496 |
| 3,059,692 | 10/1962 | Smitley | 137/508 X |
| 3,297,260 | 1/1967 | Barlow | 137/496 X |
| 3,450,155 | 6/1969 | Froehner | 137/508 |

*Primary Examiner*—Harold W. Weakley
*Attorney*—Cohn, Powell et al.

[57] ABSTRACT

A check valve for preventing outflow of fuel from a broken or disconnected fuel line of an engine has co-acting valve elements mounted on a diaphragm which normally is subjected to the negative intake pressures of the engine fuel pump. A relatively light spring tends to hold the valve elements in passage-closed position. The valve opens automatically when suction from the engine fuel pump moves the diaphragm, causing one of the valve elements to abut an adjustable stop member, whereafter continued movement of the diaphragm opens the valve passage. Such diaphragm movement is opposed by a second spring. Adjustment of the stop member enables the valve passage to be opened at a selected point in the range of diaphragm movement.

6 Claims, 3 Drawing Figures

PATENTED JAN 1 1974  3,782,410
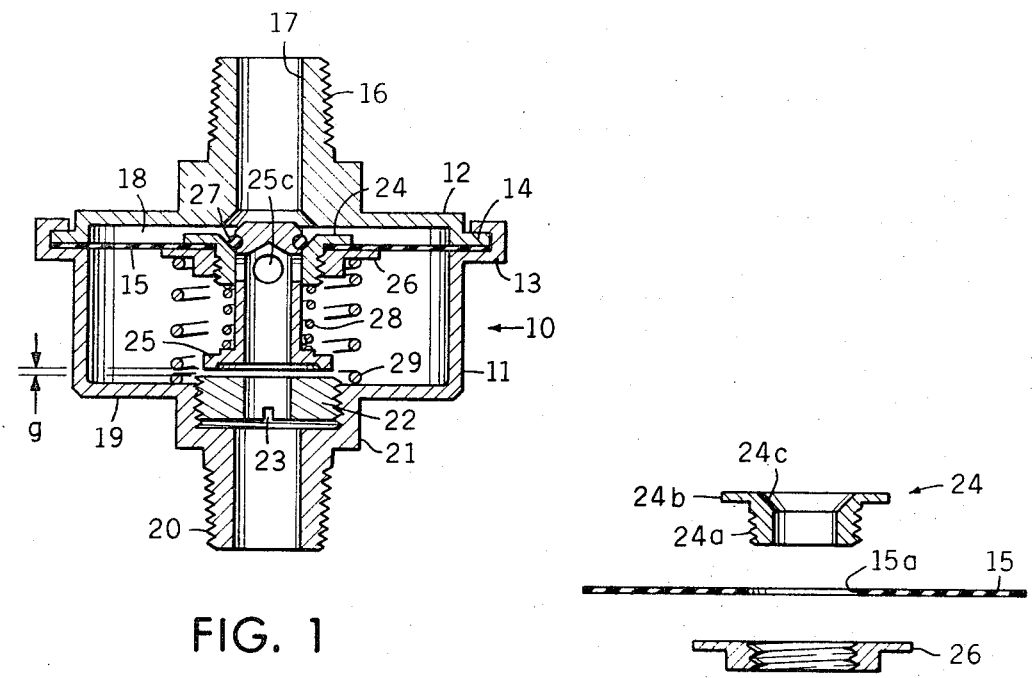
FIG. 1
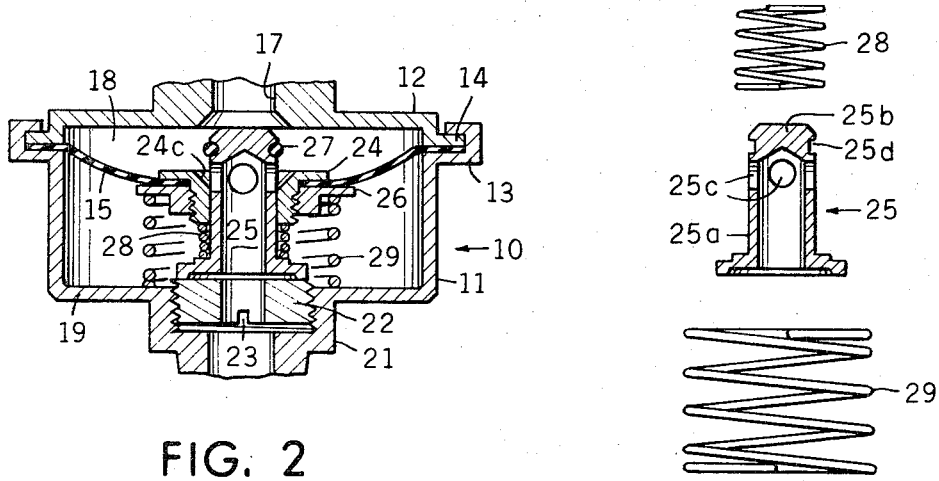
FIG. 2
FIG. 3

3,782,410

VALVE

BACKGROUND OF THE INVENTION

The present invention relates to improvements in check valves, and more particularly an improved valve for controlling flow in an engine fuel supply pipe.

Valves are customarily provided in the fuel lines of marine engines for preventing the accidental outflow of fuel, and fire hazard occasioned thereby, in the event of a break in the line or a disconnection of the line from the engine. Valves commonly employed for the purpose have proved unsatisfactory in some installations either because they do not open properly under low suction pressures, or, where made to do so, do not check the flow, such as may be induced by siphonic or hydrostatic pressures, in the event of a break in the fuel line, or its disconnection from the engine.

SUMMARY OF THE INVENTION

The present invention corrects the foregoing deficiencies in former valves used for the stated purpose by the provision of an improved valve assembly that will open under low suction pressures from the engine, yet will positively close the line and prevent out-flow in the event of a break or disconnection of the fuel line. The present invention achieves this object by the provision of a valve unit having a chamber divided by a flexible diaphragm, with connections forming inlet and outlet passages communicating with spaces on opposite sides of the diaphragm. Coacting valve elements mounted on a diaphragm that control a passage therethrough are biased by a light spring toward passage-closed condition. Movement of the diaphragm induced by suction pressures under normal operating conditions moves the valve elements until one thereof engages an adjustable stop member. With continued movement of the other element the valve passage is caused to open. A second spring acts to oppose movement of the diaphragm in a direction to open the valve passage as aforesaid.

The diaphragm provides a large surface which, when acted upon even by fuel induction forces of small magnitude, causes the valve to open and fuel to flow therethrough. When the diaphragm is not subjected to induction forces the springs act to close the valve passage and to maintain the same closed as against siphonic or hydrostatic pressures of magnitude that may be created in a broken or disconnected fuel line.

BRIEF DESCRIPTION OF THE DRAWINGS

FIG. 1 is a longitudinal sectional view through the valve assembly showing the parts in closed position.

FIG. 2 is a sectional view showing the valve parts in passage open position, and FIG. 3 is an exploded view showing the movable valve parts.

DESCRIPTION OF THE PREFERRED EMBODIMENT

The valve housing indicated generally at 10 on the drawing is made up of a generally cylindrical body 11 and a circular cover plate 12, these parts being provided with complementary marginal flanges 13 and 14 which are sealed together on opposite sides of the outer edge portions of a flexible, liquid-impervious diaphragm 15. The cover plate 12 has a nipple 16 projecting therefrom providing an inlet passage 17 that communicates centrally with the relatively shallow chamber 18 at one side of diaphragm 15. The body part 11 provides a relatively deeper chamber on the opposite or discharge side of the diaphragm 15 and its bottom wall 19 has a threaded discharge nipple 20 which is aligned with the intake nipple 16. Nipple 20 has an enlarged throat portion 21, internally threaded for the reception of a threaded, centrally apertured plug 22. Plug 22 is adapted to be turned to effect axial adjustment thereof, as by means of a screw driver which may be inserted through the open end of nipple 20 for engagement with a kerf 23 in the outer end face of the plug.

Mounted centrally on the diaphragm are coacting valve elements 24 and 25 that control the flow of fuel from the intake to the discharge sides of the diaphragm. Element 24 has a tubular, externally threaded neck portion 24a that extends through a central opening in the diaphragm. A nut 26 threaded on neck portion 24a serves, with the flanged head 24b of element 24 to clamp parts 24 and 26 tightly to the inner peripheral portion 15a of the diaphragm 15.

The valve element 25 has a tubular stem 25a that fits slidingly within the bore of element 24 through which it extends. The upper end of the stem 25a is closed by the end wall portion 25b, and immediately below this end closure the stem is provided with a series of circumferential openings 25c. An angular groove near the upper extremity of stem 25d holds a resilient O-ring 27 which, as a poppet valve head, seats against the chamfered end surface 24c of element 24 when the valve elements are in passage-closed position, as illustrated in FIG. 1. A relatively weak helical spring 28 on stem 25a is compressed between opposing shoulders of the valve elements 24 and 25, biasing these parts toward passage-closed positions.

A second compression spring 29 has one end bearing against the end wall 19 of the valve chamber 11 and the opposite end bearing against nut 26. Spring 29, which is stronger or more resistive to compression forces than spring 28, acts on the diaphragm 15 in opposition to forces thereon that tend to flex the diaphragm downwardly (FIG. 1), toward the discharge nipple 20, and moves the lower end of valve element 25 into abutment with plug 22 which is adjustable to vary the space that initially intervenes the opposing surfaces of these members.

The operation of the described valve for preventing the spilling of fuel from the supply tank, through an opening in a broken or disconnected fuel line will be apparent from the foregoing description and drawings. For purposes of completeness however, the operation of the valve is set forth as follows.

Movement of valve elements 24–25 downwardly (FIG. 1) by forces acting on diaphragm 15 in excess of the counteracting force exerted thereon by spring 29 causes the lower end of valve element 25 to abut plug 22. Continued downward movement of the valve seat element 24 relative to the arrested element 25 opens the valve passage (FIG. 2) through openings 25c in element 25. Spring 29 is sufficiently resistive to prevent downward displacement of the diaphragm sufficient to open the valve passage under hydrostatic or siphonic forces acting alone, but the valve passage readily opens when any such forces are augmented by forces induced by fuel pump operation, even should the latter be of small magnitude.

I claim as my invention:

1. A valve assembly comprising:

a. A hollow body member having spaced fluid inlet and outlet passages, b. a diaphragm separating the interior of said body member into inlet and outlet chambers communicating respectively with said inlet and outlet passages, c. coacting valve elements mounted on said diaphragm for movement therewith, said elements defining a transfer passage through the diaphragm, and including means for controlling the flow of fluid through said transfer passage, d. a first spring means biasing said elements toward positions to close the transfer passage, e. abutment means in the path of one of said valve elements for arresting movement thereof, and f. a second spring means between the body member and diaphragm to oppose movement thereof induced by fluid pressure in said inlet chamber.

2. The valve assembly defined in claim 1 wherein said coacting valve elements include a tubular first element providing an annular valve seat at one end, and a second element extending through the said first element and having a poppet head engageable with said valve seat of the said first element.

3. The valve assembly defined in claim 2 wherein: the second valve element has a tubular stem portion slidable longitudinally within the said first element, the stem of said second element having a wall opening below its poppet head.

4. The valve assembly defined in claim 3 wherein: said first and second spring means impose forces on said first valve element in a direction opposing movement thereof to open the transfer passage.

5. The valve assembly defined in claim 4 wherein: the said second spring has greater resistance to deflection than does the said first spring.

6. The valve assembly defined in claim 4 wherein: said stop shoulder is adjustable in a direction toward and from said valve elements.

* * * * *